Feb. 28, 1928.
H. O. HEM
1,660,673
PREDETERMINED WEIGHT SCALE
Filed June 13, 1921    2 Sheets-Sheet 2
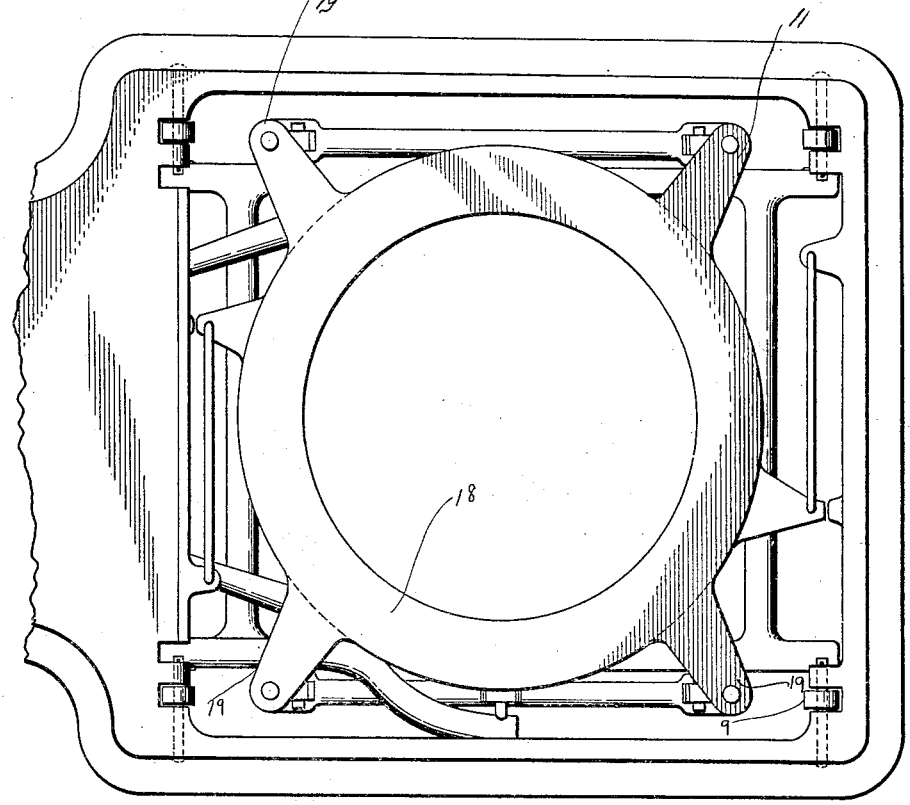
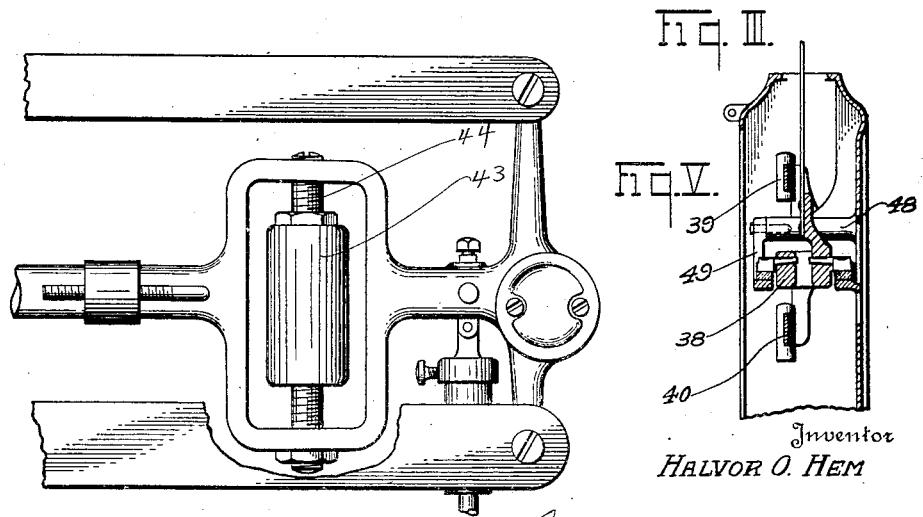
Inventor
HALVOR O. HEM
By CC Marshall
Attorney Patented Feb. 28, 1928.

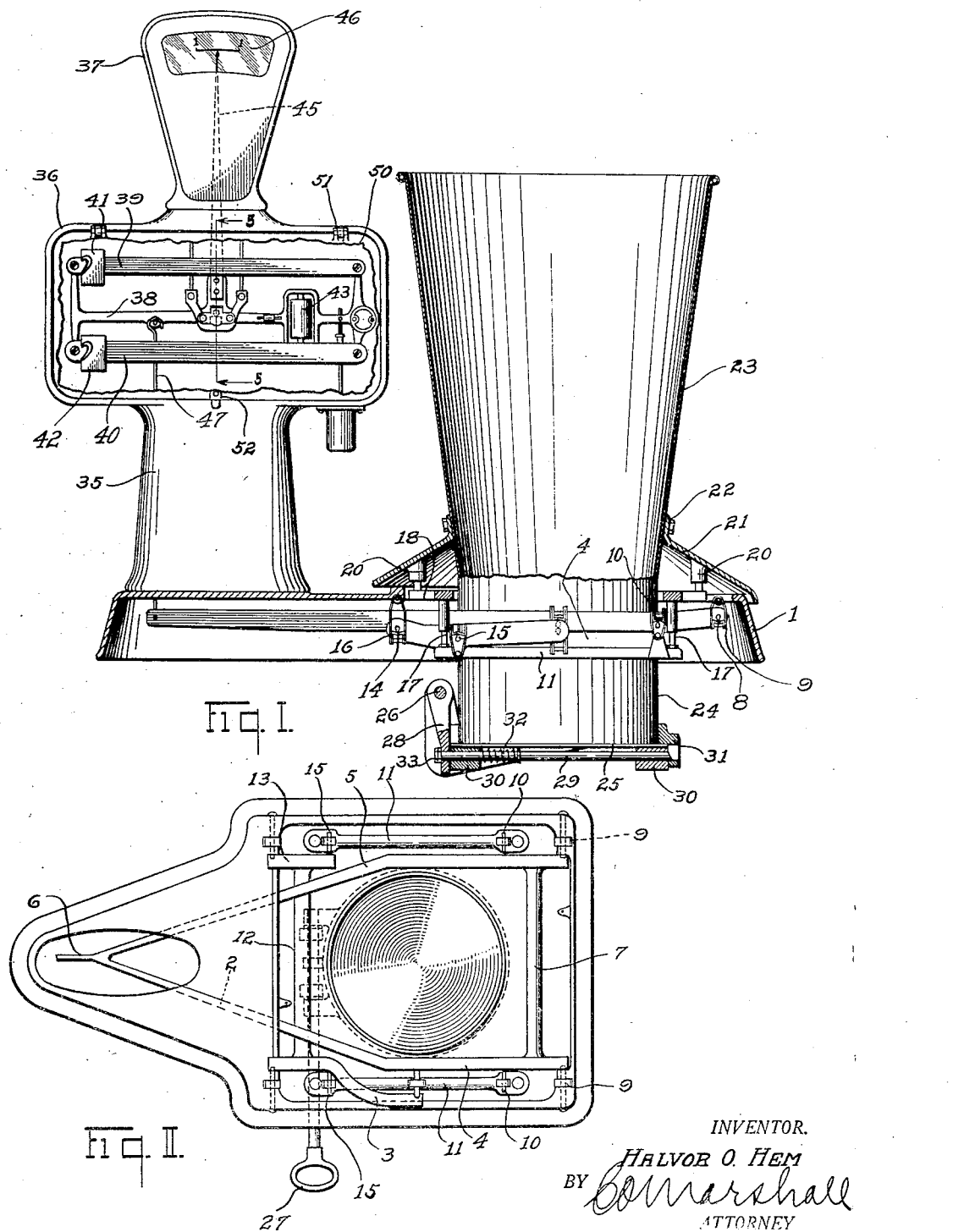

1,660,673

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

PREDETERMINED WEIGHT SCALE.

Application filed June 13, 1921. Serial No. 477,152.

This invention relates to weighing scales, and particularly to scales of the class known as predetermined weight scales.

One of its principal objects is to provide a scale of comparatively great capacity having a sensitive indicator capable of indicating variations from a predetermined weight in fractions of ounces.

Another object is to provide a scale of this kind having very simple load-offsetting mechanism.

Another object is to provide a scale of this type having a combined beam lever and automatic load-counterbalancing device.

Another object is to provide a scale of this type having means for varying the sensitiveness of the automatic load-counterbalancing device.

Another object is the provision of a scale having a commodity-receiver in the form of a hopper with a discharge chute passing downwardly through the platform lever mechanism.

Still another object is to provide a hopper scale of this type with means for protecting the platform lever mechanism from material which might otherwise fall upon it in filling the hopper.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is an elevational view of a scale embodying my invention, parts being broken away and parts shown in section;

Figure 2 is a plan view of the base of the scale, showing the platform levers and the lower portion of the hopper;

Figure 3 is an enlarged detail fragmentary view showing the base of the scale and a part of the platform lever mechanism, with the hopper supporting frame thereon;

Figure 4 is an enlarged detail fragmentary view showing a portion of the combined lever and automatic load-offsetting device; and Figure 5 is a sectional view taken substantially on the line 5—5 of Figure 1.

Referring to the drawings in detail, the base 1 of the scale supports and houses the platform levers, comprising a long lever 2 and an oppositely extending short lever 3 which is pivotally connected to the long lever 2. The long lever 2 consists of two members 4 and 5 which merge adjacent the nose 6 of the lever and are connected at their divergent ends by a laterally extending member 7. Each of the members 4 and 5 is provided with a fulcrum pivot 8 which is supported by means of a swinging bearing 9 from the base 1 and a load pivot 10 which swingingly supports one end of a bar 11. The short lever 3 includes a laterally extending member 12 similar to the member 7 and a short section 13, the fulcrum pivots 14 and load pivots 15 of the short lever being carried by the section 13 and the extended portion 3 of the lever. The fulcrum pivots are swingingly suspended by a bearing member 16 from the base 1 and the load pivots swingingly support the ends of the bars 11 opposite the end supported by the load pivots 10 of the long lever.

The long lever 2 is made in the form shown for the purpose of giving it greater strength and rendering it more nearly inflexible. In cases in which such great strength is not required, it is obvious that the long lever may, like the short lever, be made of a short section on one side supporting the load and fulcrum pivots and an extended section on the other supporting the nose pivot. Supported by means of adjustable legs 17 on the bars 11 is a hopper supporting frame 18 consisting essentially of an annulus having lugs 19 projecting horizontally from its periphery. This frame 18 lies within an opening in the upper side of the base. Supported by means of lugs 20 upon the frame 18 is a sloping cover 21 which extends over the opening in the upper side of the base that is occupied by the frame 18. Owing to the frusto-pyramidal shape of the cover, such material as is spilled about the hopper will be deflected away from the moving parts of the scale. The cover 21 is provided with a circular central opening surrounded by an upstanding flange 22 to which is secured the commodity-receiver 23, which, as shown, is in the form of a hopper having a vertical discharge chute 24 of comparatively large diameter extending downwardly through the supporting frame 18 and the platform levers. The lower end of the discharge chute 24 is closed by a hinged plate 25. The pintle of the cover hinge is a shaft 26 having one end extending beyond the side of the base and having a handle 27 fixed thereto. A downwardly extending arm 28 is also fixed to the shaft 26 adjacent the side of the chute 24 and the lower end of the arm 28 is provided with an opening through which passes a rod 29 which is slidably mounted in bearings 30 secured to the plate 25. The end of the rod 29 opposite the hinged side of the plate 25 is beveled, as shown in Figure 1, and extends into a keeper 31 mounted or secured to the side of the chute 24.

The rod 29 is normally held in the position shown in Figure 1 by means of a spring 32, but when the plate 25 is swung upwardly to close the lower end of the chute the beveled end of the rod 29 strikes the keeper 31 and the rod is forced longitudinally against the tension of the spring 32, allowing it to pass into registration with the opening in the keeper when the spring urges it forward into the position shown in Figure 1, in which the plate 25 is locked in closed position. When it is desired to open the lower end of the chute 24 the operator grasps the handle 27 and turns it to the right. The arm 28, being fixed to the shaft, presses against the head 33 on the rod 29 and thus withdraws the rod against the tension of the spring 32 from engagement with the keeper 31. Continued turning of the shaft 26 acts through the arm 28, the head 33, the rod 29, spring 32, and one of the bearings 30 to swing the plate 25 away from the lower end of the chute 24.

The shape of the hopper is such that when the plate 25 is swung away from the lower end of the chute the contents of the hopper are discharged in a mass without delay. The hopper commodity-receiver mounted as above set forth is particularly useful in weighing commodities suc has dried fruits which are to be packed in boxes of definite net weights. When the scale is so used it may be placed above a conveyor by which the empty boxes are brought beneath the scale and are carried away when filled.

Supported at the right end of the base 1 is an upright hollow column 35 having a substantially rectangular chamber 36 at its upper end and being surmounted by a fan-shaped housing 37. Fulcrumed within the chamber 36 is a combined beam lever and automatic load-offsetting member comprising a lever 38 to which are secured parallel beams 39 and 40 carrying poises 41 and 42. Mounted for vertical adjustment on the lever 38 is a weight 43. By moving the weight 43 upwardly or downwardly on the threaded shaft 44 by which it is supported the center of mass of the lever 38 and the parts carried thereby may be raised or lowered. The weight 43 is so positioned that the center of mass of the lever and the parts carried thereby is below the fulcrum pivot, and the lever therefore acts as an automatic load-counterbalancing pendulum.

Secured to the lever and extending upwardly into the fan-shaped housing 37 is an indicator hand 45 which co-operates with a chart 46, the chart being graduated to show the variation in ounces from the weight previously determined upon for the load in the commodity-receiver. If the position of the weight 43 is such that the center of mass of the lever 38 and the parts carried thereby is considerably below the fulcrum pivot of the lever the ounce graduations upon the chart 46 must be less widely spaced than if the weight 43 is adjusted so that the center of mass of the lever 38 is very little below the fulcrum pivot of the lever.

When the scale is to be used for weighing, the poises 41 and 42 are set in positions on the beams 39 and 40 in which they will exactly counterbalance a load in the commodity-receiver of the weight previously determined upon. Since the lever 38 is connected by means of a steelyard rod 47 to the nose 6 of the lever 2 and the steelyard rod 47 is connected to the lever 38 at the left of its fulcrum, if the load in the commodity-receiver be too heavy the excess will be offset by the swing of the center of mass of the lever 38 and parts carried thereby to the right. If the load be too light, the excess weight of the poises will be offset by a similar swing of the center of mass of the lever to the left.

By inspection of Figure 5 it will be noted that the bracket 48 which supports the yoke 49 containing the bearing in which the forward fulcrum pivot of the lever 38 rests extends between the beams 39 and 40. By virtue of this construction I am enabled to avoid the undesirable overhang which is present in the tare beam levers of most automatic scales.

The rectangular chamber 36 containing the beam levers may, if desired, be equipped with a door 50 preferably hinged, as at 51, at the top of the chamber. This door may be provided with a lock 52 so that after the poises are set and the weight 43 is properly adjusted the load-offsetting mechanism of the scale cannot be readjusted or tampered with by unauthorized persons. By using a dischargeable hopper in connection with a predetermined weight scale, the weighing mechanism of which may be locked, I have provided a scale that is exceptionally well adapted for use in packing fruit, etc.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.